Figure 1:
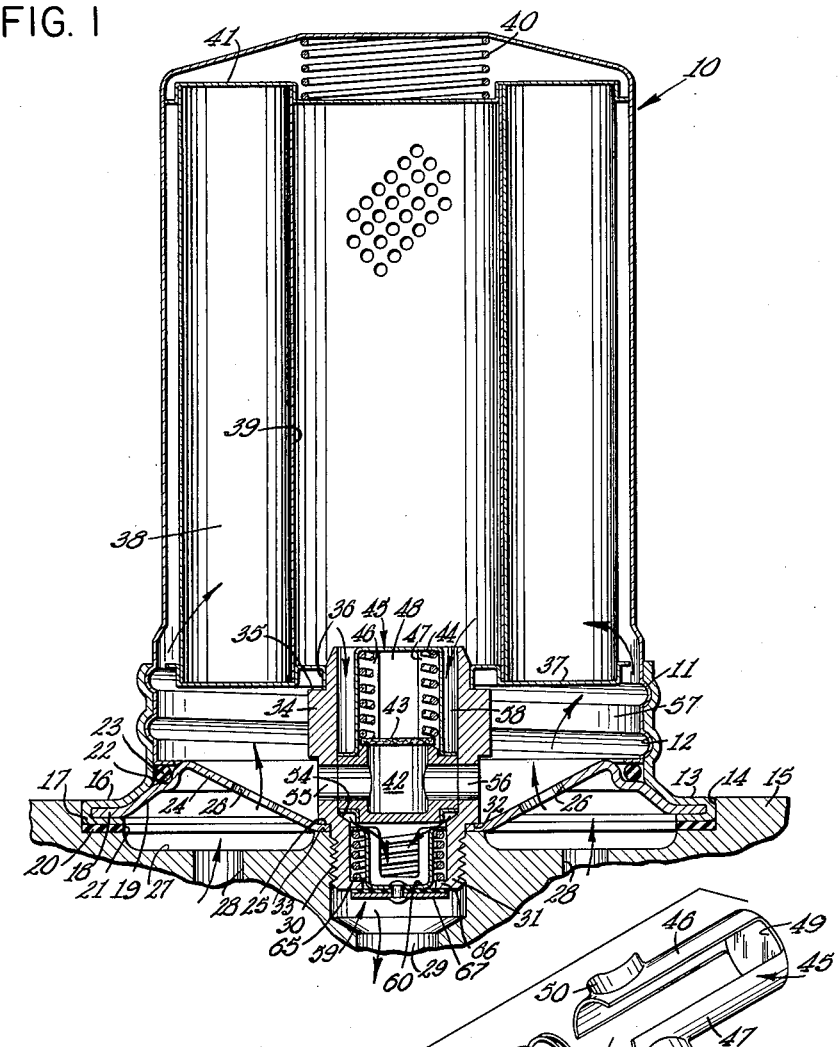

Sept. 19, 1961 W. H. HULTGREN 3,000,506
THROWAWAY TYPE FILTER
Filed May 27, 1959 2 Sheets-Sheet 1

INVENTOR.
WILLIAM H. HULTGREN
BY *Lawrence J. Winter*
ATTORNEY

Sept. 19, 1961 W. H. HULTGREN 3,000,506
THROWAWAY TYPE FILTER
Filed May 27, 1959 2 Sheets-Sheet 2

INVENTOR.
WILLIAM H. HULTGREN
BY Lawrence J. Winter
ATTORNEY () # United States Patent Office 3,000,506
Patented Sept. 19, 1961

3,000,506
THROWAWAY TYPE FILTER
William H. Hultgren, Readington, N.J., assignor to Purolator Products, Inc., Rahway, N.J., a corporation of Delaware
Filed May 27, 1959, Ser. No. 816,188
15 Claims. (Cl. 210—133)

The present invention relates to a liquid filter and more particularly to a filter which is mounted directly upon the engine block of an internal combustion engine.

In liquid filters for automotive use today it is common to provide a filter unit of the type in which a filter element is permanently disposed in a housing that is coupled to the oil inlet and outlet of the engine by attaching it directly to the engine block. When the filter element or cartridge needs replacing the whole unit is removed and discarded and a new one installed upon the engine block by merely unscrewing the unit from the block. This screw-in throwaway type of oil filter unit takes the full flow of oil from the engine crankcase forced through it by the oil pump and discharges the full oil flow through the engine parts and bearings requiring lubrication, thus providing complete filtration of all oil sent to the engine parts.

Because this type of oil filter is a full flow oil filter it is necessary that there be means to by-pass the filter upon clogging of the filter element so that the engine will not be starved of oil and it is further necessary that valve provisions be incorporated in the filter which will prevent oil from the engine from leaking back through the filter to the crankcase so that upon initial starting the engine will not be starved of oil. Accordingly, the screw-on throwaway type filter unit is provided with a by-pass or relief valve and other valve provisions to prevent drainage of oil from the engine which are permanently enclosed in the filter housing. However, since the filter unit is thrown away upon the filter element therein becoming clogged with dirt it has become expensive to discard these valves necessary for the proper operation of the filter unit. It has also been wasteful since the valves have had little use and their service life is equivalent to the operational life of the car, rather than a life span of 4000 to 5000 miles only which is the efficient service life of the filter element.

The principal object of the present invention is to provide a filter unit mounted directly on the engine block of an engine with valve means which do not have to be discarded with the filter cartridge or housing as heretofore.

Another object of the present invention is to provide a full flow throwaway type filter unit in which the relief valve and one way valve are disposed in an adapter member secured to the engine block so that they may be used indefinitely.

Another object of the present invention is to provide a full flow throwaway filter unit screwed on to the engine block having valve means to prevent flow of liquid out of the lubricated engine parts when the filter unit is removed therefrom.

Another object of the present invention is to provide a screw-on full flow type filter unit in which the filter element disposed therein may be replaced without discarding any of the other parts of the unit of the combination.

Another object of the present invention is to provide a screw-on full flow type filter unit in which the filter element and thin metal casing in which it is housed may be replaced without discarding the relief valve and check valve combined therewith.

Another object of the present invention is to provide an adapter member for a screw-on type full flow filter unit having a novel relief valve disposed therein.

Figure 2:
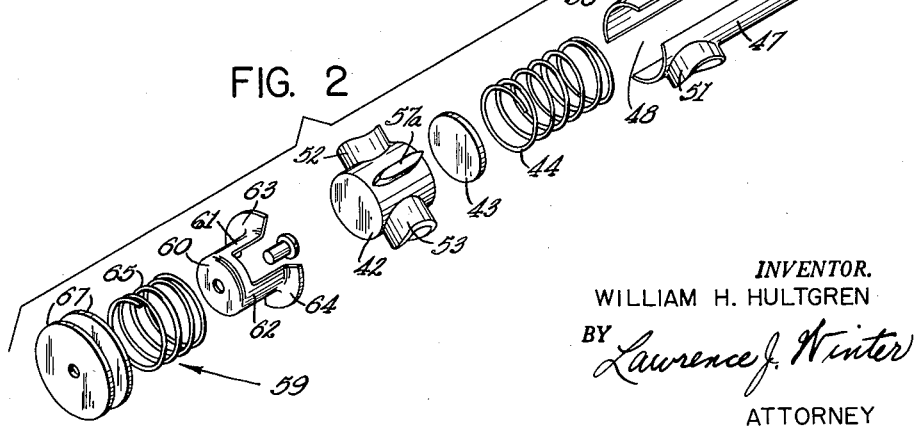
Figure 3:
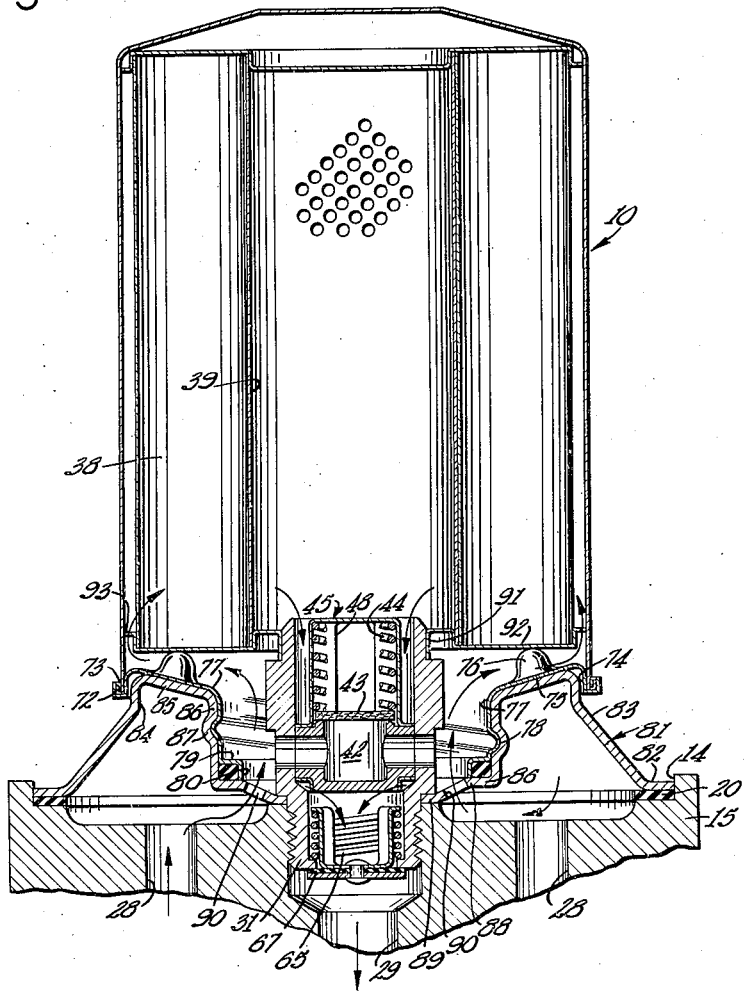

Various other objects and features of the invention will be readily apparent when considered in connection with the following detailed description and accompanying drawings forming a part thereof and in which:

FIG. 1 is a vertical view, partly in section, of a filter unit embodying the present invention, FIG. 2 is an exploded isometric detail view of the valve parts disposed in the adapter member of the present invention, and FIG. 3 is a vertical view, partly in section, of a modified form of the invention shown in FIG. 1.

Referring to FIGS. 1 and 2 the reference numeral 10 designates a thin metal cylindrical housing which is closed at the top and open at the bottom. The lower end of the housing is provided with external screw threads 11 adapted to mate with the internal threads 12 in the upper end of a cylindrical adapter plate 13 disposed in a circular recess 14 of the engine block 15 of an internal combustion engine. The lower end of the adapter plate 13 is turned outwardly and has a horizontal peripheral flange 16 and lip 17 bent inwardly and rolled over the horizontal peripheral flange 18 of an annular sealing plate 19 to lock the adapter plate thereto. The rolled seam of lip 17 seats on annular resilient gasket 20 positioned on shoulder 21 provided in the engine block recess. Seal plate 19 is offset upwardly adjacent lip 18 and then extends inwardly to provide a shoulder 22 for a resilient O-ring 23. The seal plate then extends upwardly and is inclined downwardly at 24 to a point adjacent its central opening where it is bent into a horizontal lip 25. Spaced oil inlet ports 26 are disposed in 24 around the central opening and communicate with an annular recess 27 in the bottom of the engine block recess to receive incoming oil from spaced oil inlet passages 28 which communicate with the engine oil pump not shown.

A central discharge passage 29 is disposed in the engine block with its upper end threaded to receive mating external threads 30 on the lower end of a hollow adapter member or bushing 31. Bushing 31 has an annular shoulder 32 adapted to seat against lip 25 of the sealing plate to secure the plate against an annular shoulder 33 formed in the bottom of recess 14 adjacent the upper end of the discharge passage.

The upper end of bushing 31 has an outwardly extending shoulder 34 which is preferably of hexagonal shape to receive a wrench so that the bushing can be screwed tightly onto the engine block. Shoulder 34 and the top of the bushing provide a seat 35 for mounting annular inner flange 36 of the filter element end cap 37 thereon. The filter element 38 is a conventional resin impregnated annular pleated paper filter provided with a perforated center tube 39. A conventional coiled spring 40 disposed between the top of the filter housing and upper circular filter end cap 41 maintains the filter element seated on the bushing.

Adapter member 31 has a relief valve and a one way valve completely disposed therein to prevent leakage of oil from discharge passage 29 in the engine block through the oil filter housing when the engine is stopped or to prevent oil drainage from the passage when the filter housing is removed.

The relief valve consists of a cylindrical cup member 42 having an open top, a circular valve disc 43, a coiled spring 44 and a cylindrical thin metal split sleeve 45. Sleeve 45 consists of cylindrically arcuate or curved spaced side walls 46 and 47 with the portions between the walls cut away to form longitudinal slots or openings 48 therebetween. The upper ends of walls 46 and 47 are joined to a circular disc 49 which forms the top of the sleeve. The lower portion of walls 46 and 47 are provided with oppositely disposed cylindrical inlet tubes 50 and 51 which project outwardly therefrom.

Cylindrical cup 42 is also provided with outwardly extending and oppositely disposed cylindrical inlet tubes 52 and 53 adapted to fit within the corresponding inlet tubes 50 and 51 respectively on the sleeve in a press or interference fit to prevent leakage of oil therebetween. Cup 42 is positioned in sleeve 45 by spreading the lower end of the resilient thin metal sleeve apart, inserting the cup therein and snapping or pressing it together again when tubes 52 and 53 are disposed in tubes 50 and 51. This is done after spring 44 is first inserted into the sleeve to abut the top disc 49 and valve disc 43 is placed therein below the spring.

The completed relief valve assembly is then positioned in the hollow adapter bushing by inserting sleeve 45 in through the top opening of the bushing and sliding it down until it seats against the peripheral shoulder 54 formed on the inner surface of the bushing. The inlet tubes 50 and 52 and inlet tubes 51 and 53 are disposed laterally in alignment with the oil inlet openings or ports 55 and 56 respectively provided in the bushing wall so that valve disc 43 is in communication with the annular oil inlet chamber 57 formed between the upper surface of the sealing plate 19 and the bottom of the filter element 38. Oppositely disposed guide members 57a on cup 42, along with the inlet tubes guide the cup as it is moved into its proper position. The outer edges of the inlet tubes form a press or interference fit with the inner surface of the bushing to prevent leakage of oil therebetween. It will be noted that the outside diameter of the sleeve is substantially smaller than the inside diameter of the bushing to define an annular oil discharge chamber 58 therebetween.

One way valve 59 comprises a thin metal member having a circular bottom 60 and spaced vertical sidewalls 61 and 62 providing openings therebetween, with outwardly turned horizontal lips or flanges 63 and 64 on the upper ends thereof, a coiled spring 65 and valve disc 67. The coiled spring is disposed in the lower end of bushing 31 on inturned peripheral lip 66 formed thereon and has its upper end bearing against the sidewall lips 63 and 64 of the valve. The valve disc 67 comprising a metallic and a resilient washer, is riveted to circular bottom 60 and overlaps lip 66 of the bushing so that the valve will only permit one way flow into discharge passage 29 and prevent any drainage of oil under pressure back into the filter housing through bushing 31.

In operation when the engine is started the engine oil pump not shown, forces oil through passages 28 and the engine block recess into the filter housing 10 through oil inlet ports 26. The incoming oil passes through the filter cartridge 38 flowing in an outside-in direction and is discharged through the center tube. The clean oil flows into bushing 31 and annular space 58 around sleeve 45 passing around the outside of tubes 50 and 51 and through the top and the sidewall openings in one way valve 59. The pressure of the oil overcomes the force in spring 65 holding valve disc 67 seated and moves the valve disc away from the lower end of the bushing so that the oil passes out of the spaced openings of valve 59 and is discharged into passage 29 flowing to the engine parts.

When the filter element 38 becomes clogged with dirt or contaminants so that a predetermined pressure drop thereacross is exceeded, the incoming oil flowing through the inlet ports 26 enters inlet tubes 52 and 53 and unseats relief valve disc 43 overcoming the force in spring 44 normally holding it seated. The oil then passes through openings 48 in sleeve 45 and flows downwardly in annular chamber 58 through the top and side openings of one way valve 59 after which it is discharged into the passage 29 thus by-passing the filter.

When the filter element has become clogged with contaminants the filter housing 10 is removed from the engine block by unscrewing it from adapter plate 13, the dirty filter element is removed from the housing and a new element inserted after which housing 10 is again screwed on the adapter plate. Thus, it is readily seen that the present invention provides a filter unit of the full flow type screwed directly upon the engine block which can be removed therefrom for replacement of the filter element or cartridge only, without discarding the relief valve and one way valve required in such an assembly thereby providing an economical filter unit in which the necessary valve provisions are not wastefully discarded. It is also apparent that upon disconnecting the filter housing from the block that there is no back flow of oil from the engine parts as the one way valve does not have to be removed thereby eliminating starving the engine parts of oil upon starting of the engine.

The modification of the invention shown in FIG. 3 is substantially the same as that in FIG. 1 with the necessary relief valve and one way valve incorporated in the adapter bushing so that they are not discarded when the filter element is replaced, except that housing 10 is provided with a bottom closure member 71 so that both the housing and the filter element may be discarded after the filter element becomes clogged.

Closure member 71 is provided with a lip or seam 72 rolled over lip 73 of the housing by which it is locked thereto. The closure plate or member has an upturned flange 74 adjacent its outer periphery which extends into the housing and a downwardly angled portion 75 extending from flange 74 toward its inner periphery. Hemispherically shaped protuberances or hollow bosses 76 are spaced therein for seating the filter element thereon. The closure plate then extends vertically downwardly at 77 where it is provided with external threads 78. The inner periphery of the closure plate terminates in a horizontal flange 79 and a vertical lip 80 that preferably stops against sealing plate 81 when the filter housing is properly secured against the sealing plate.

The sealing plate has a circumferential flange 82 and includes an upwardly offset portion 83 terminating in vertical portion 84 adjacent peripheral flange 74 of the closure plate. Thereafter, the plate extends downwardly at 85 and 86 to mate with portions 75 and 77 of the closure member. Portion 87 has internal threads that mate with the closure member threads. The plate is horizontal, inwardly of 86 and turns downwardly at 88, terminating in a horizontal flange 89 against which bushing 31 is mounted. Spaced oil inlet ports 90 are disposed in the sealing plate at 88.

A downwardly extending annular flange 91 is provided adjacent the inner periphery of the bottom end cap 92 for mounting the filter element on the bushing. The outer periphery of the end caps are provided with spaced tabs or fingers 93 for positioning the filter element centrally of the filter housing. If desired, a coiled spring may be inserted between the upper end cap and housing as in the embodiment shown in FIG. 1.

The operation of the embodiment of the invention in FIG. 3 is substantially the same as that in FIG. 1 except that when the filter element requires changing, the housing is unthreaded from the sealing plate, and the filter thin metal housing is discarded along with the filter element and a new metal housing and filter element is mounted on the sealing plate.

What is claimed is:

1. In combination, an engine block, a full flow screw-on filter unit having a filter element mounted on said block, a hollow adapter bushing threaded into said block to secure said unit thereto and for discharging oil to said block, oil inlet means in said filter unit for receiving dirty oil from said block, a portion of said bushing extending into said unit and having said filter element seated thereon, a relief valve disposed in said bushing for by-passing said filter element comprising a stationary sleeve member forming a discharge chamber with said bushing, a valve member in said sleeve, biasing means for normally maintaining said valve member seated, and an inlet tube communicating with said oil inlet means and said sleeve.

2. In combination, an engine block, a full flow screw-on filter unit mounted on said block, a filter element in said unit, a hollow adapter bushing threaded into said block to secure said filter unit thereto and for discharging oil to said block, oil inlet means in said filter unit for receiving dirty oil from said block, a portion of said bushing extending into said unit and having said filter element seated thereon, a relief valve disposed in said bushing for by-passing oil around said filter element comprising a sleeve defining a discharge chamber with said bushing, a valve member in said sleeve, biasing means for normally maintaining said valve member seated, an inlet tube communicating with said oil inlet means and said sleeve, and a one way valve disposed in said bushing for preventing back flow therethrough comprising a valve disc and biasing means for maintaining said disc closed except when oil is discharged from said bushing.

3. In combination, an engine block, a full flow screw-on cylindrical filter unit mounted on said block, an annular filter element in said unit, a hollow adapter bushing threaded into said block to secure said unit thereto and for discharging oil to said block, oil inlet means in said filter unit for receiving dirty oil from said block, a portion of said bushing extending into said unit and having said filter unit seated thereon, a relief valve disposed in said bushing for by-passing oil around said filter element comprising a split sleeve having an outwardly projecting inlet tube, said sleeve forming a discharge chamber with the interior of said bushing, a cup member having an outwardly projecting tube disposed in said inlet tube, a valve member positioned in said sleeve, biasing means normally maintaining said valve member seated on said cup member, said tube being in communication with said oil inlet means.

4. A filter unit comprising a cylindrical casing having one end closed, a filter element therein, a threaded cylindrical adapter plate, a sealing plate having an oil inlet opening and a central opening secured to said adapter plate, a hollow threaded bushing in said filter unit disposed in said central opening for mounting the unit upon an engine, said casing being threadably connected to said adapter plate adjacent its open end, said filter element being seated on said bushing, and a relief valve disposed in said bushing for by-passing the filter element when it becomes clogged comprising a stationary sleeve member forming a discharge chamber with the inner surface of said bushing, a valve member within said sleeve, biasing means normally maintaining said valve member seated, and an inlet tube in communication with said sleeve member and oil inlet opening.

5. A filter unit comprising a cylindrical casing having a threaded open end, an adapter plate threaded to receive said casing, a sealing plate secured to said adapter plate, said sealing plate having oil inlet openings therein spaced around a central opening, a hollow bushing disposed in said central opening having a threaded portion extending therebelow, an annular filter element in said casing seated on said bushing, a split sleeve in said bushing having outwardly projecting tubes, said sleeve forming a discharge passage with the interior of said bushing, a cup member positioned within said sleeve having outwardly projecting tubes disposed in said sleeve tubes, a valve seated on said cup member, biasing means normally maintaining said valve seated, said cup tubes being in communication with said oil inlet openings.

6. A filter unit comprising a cylindrical casing having an open end, an annular filter element therein, a threaded closure member permanently sealing said filter element therein, a threaded sealing plate adapted to receive said closure member, said plate having a plurality of oil inlet openings spaced therein around a central opening, a hollow bushing disposed in said central opening having a threaded portion extending therebelow for securing the filter unit to an engine, said filter element being seated on said bushing, a split sleeve in said bushing having outwardly projecting tubes, said sleeve forming a discharge passage with the inner surface of said bushing, a cup member in said sleeve having outwardly projecting tubes fitting within said sleeve tubes, a valve seated on said cup member, biasing means normally maintaining said valve seated, said cup tubes communicating with said oil inlet openings and an anti-drainback valve disposed in said bushing for preventing back flow therethrough comprising a valve disc and biasing means for maintaining said disc closed except when oil is discharged from said bushing.

7. An adapter bushing for mounting a filter unit on an engine having an inlet opening in its wall, a threaded end and relief valve therein comprising a split sleeve forming a discharge chamber with the interior of the bushing, a cup member having an outwardly projecting tube disposed in said sleeve, said tube being disposed in alignment with said inlet opening, a valve member seated on said cup member, and biasing means normally maintaining said valve member closed.

8. An adapter bushing for mounting a filter unit on an engine having inlet openings in its wall, a threaded end and a relief valve therein comprising a split sleeve providing a discharge chamber with the inner surface of the bushing, said sleeve having outwardly projecting inlet tubes thereon, a cup member in said sleeve having outwardly projecting inlet tubes disposed in said sleeve tubes and in alignment with said inlet openings, a valve member seated on said cup member, and biasing means normally holding said valve member seated.

9. In combination, an engine block, a full flow screw-on cylindrical filter unit mounted on said block, an annular filter element in said unit, a hollow adapter bushing threaded into said block to secure said unit thereto and for discharging oil to said block, oil inlet means in said filter unit for receiving dirty oil from said block, a portion of said bushing extending into said unit and having said filter unit seated thereon, a relief valve disposed in said bushing for by-passing oil around said filter element comprising a split sleeve having an outwardly projecting inlet tube, said sleeve forming a discharge chamber with the interior of said bushing, a cup member having an outwardly projecting tube disposed in said inlet tube, a valve member positioned in said sleeve, biasing means normally maintaining said valve member seated on said cup member, said tube being in communication with said oil inlet means, and a one-way valve disposed in said bushing below said cup member to prevent back flow of oil discharged from said bushing.

10. A filter unit comprising a cylindrical casing having a threaded open end, an adapter plate threaded to receive said casing, a sealing plate secured to said adapter plate, said sealing plate having oil inlet openings therein spaced around a central opening, a hollow bushing disposed in said central opening having a threaded portion extending therebelow, an annular filter element in said casing seated on said bushing, a split sleeve in said bushing having outwardly projecting tubes, said sleeve forming a discharge passage with the interior of said bushing, a cup member positioned within said sleeve having outwardly projecting tubes disposed in said sleeve tubes, a valve seated on said cup member, biasing means normally maintaining said valve seated, said cup tubes being in communication with said oil inlet openings, a one-way valve disposed in said bushing adjacent said threaded portion comprising a metal member having a circular bottom and spaced sidewalls forming openings therebetween, lips on said walls, a valve disc seated against the end of said bushing, and biasing means disposed between said lips and a flange on said bushing for maintaining said disc seated except when oil is being discharged from said bushing.

11. A filter unit comprising a cylindrical casing having an open end, an annular filter element therein, a threaded closure member permanently sealing said filter element therein, a threaded sealing plate adapted to receive said closure member, said plate having a plurality of oil inlet openings spaced therein around a central opening, a hollow bushing disposed in said central opening having a threaded portion extending therebelow for securing the filter unit to an engine, said filter element being seated on said bushing, a split sleeve in said bushing having outwardly projecting tubes, said sleeve forming a discharge passage with the inner surface of said bushing, a cup member in said sleeve having outwardly projecting tubes fitting within said sleeve tubes, a valve seated on said cup member, biasing means normally maintaining said valve seated, said cup tubes communicating with said oil inlet openings, a one-way valve disposed in said bushing adjacent said threaded portion comprising a metal member with spaced sidewalls having outturned lips, a valve disc seated against the end of the bushing, and biasing means mounted between said lips and a flange on said bushing to maintain said valve disc seated except when oil is discharged from said bushing.

12. An adapter bushing for mounting a filter unit on an engine having inlet openings in its wall, a threaded end and a relief valve therein comprising a split sleeve providing a discharge chamber with the inner surface of the bushing, said sleeve having outwardly projecting inlet tubes thereon, a cup member in said sleeve having outwardly projecting inlet tubes disposed in said sleeve tubes and in alignment with said inlet openings, a valve member seated on said cup member, biasing means normally holding said valve member seated, a one-way valve disposed in said bushing adjacent said threaded end consisting of a metal member with spaced sidewalls and outturned lips thereon, a valve disc seated against the end of the threaded end, and biasing means mounted around said metal member for holding said valve disc closed except when liquid is discharged therefrom.

13. An adapter bushing for mounting a filter unit on an engine having an inlet opening in its wall, a threaded end, a split sleeve forming a discharge chamber with the interior of the bushing, an inlet tube projecting outwardly of said sleeve, a cup member having an outwardly projecting tube, said cup member being positioned within said sleeve, said cup tube being press-fitted within said inlet tube, said tubes being disposed laterally of said bushing in alignment with said inlet opening, a valve disc seated on said cup member, and biasing means normally maintaining said disc seated.

14. A filter unit comprising a cylindrical casing having one end closed, a filter element therein, a threaded cylindrical adapter plate, a sealing plate having an oil inlet opening and a central opening secured to said adapter plate, a hollow threaded bushing in said filter unit disposed in said central opening for mounting the unit on an engine, said casing being threadably connected to said adapter plate adjacent its open end, said filter element being seated on said bushing, and a relief valve disposed in said bushing for by-passing the filter element when it becomes clogged comprising a stationary sleeve member forming a discharge chamber with the inner surface of said bushing, a valve member within said sleeve, biasing means normally maintaining said valve member seated, an inlet tube in communication with said sleeve member and oil inlet opening, and an anti-drainback valve disposed in said bushing for preventing back flow therethrough comprising a valve disc and biasing means for maintaining said disc closed except when oil is discharged from said bushing.

15. An adapter bushing for mounting a filter unit on an engine having an inlet opening in its wall, a threaded end and relief valve therein comprising a split sleeve forming a discharge chamber with the interior of the bushing, a cup member having an outwardly projecting tube disposed in said sleeve, said tube being disposed in alignment with said inlet opening, a valve member seated on said cup member, biasing means normally maintaining said valve member closed, and an anti-drainback valve disposed in said bushing for preventing back flow therethrough comprising a valve disc and biasing means for maintaining said disc closed except when oil is discharged from said bushing.

References Cited in the file of this patent

UNITED STATES PATENTS

| | | |
|---|---|---|
| 2,649,277 | Blackford | Aug. 18, 1953 |
| 2,888,141 | Coates et al. | May 26, 1959 |
| 2,894,630 | Humbert | July 14, 1959 |